(12) United States Patent
Horn et al.

(10) Patent No.: US 6,610,813 B2
(45) Date of Patent: Aug. 26, 2003

(54) HIGHLY-HALOGENATED LOW OPTICAL LOSS POLYMER

(75) Inventors: Keith A. Horn, Corning, NY (US); Thomas M. Leslie, Horseheads, NY (US); James V. Suggs, Corning, NY (US); Mingqian He, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/217,705

(22) Filed: Aug. 13, 2002

(65) Prior Publication Data

US 2003/0013833 A1 Jan. 16, 2003

Related U.S. Application Data

(62) Division of application No. 09/705,614, filed on Nov. 3, 2000, now Pat. No. 6,470,131.

(51) Int. Cl.[7] .............................................. C08G 63/00
(52) U.S. Cl. ...................... 528/191; 528/176; 528/194; 528/308.6; 528/308; 528/401
(58) Field of Search ................................ 528/176, 191, 528/308, 194, 308.6, 401

(56) References Cited

U.S. PATENT DOCUMENTS

| | | |
|---|---|---|
| 4,495,345 A | 1/1985 | Kawakami et al. |
| 4,979,799 A | 12/1990 | Herbrechtsmeier et al. |
| 4,986,630 A | 1/1991 | Herbrechtsmeier et al. |
| 5,129,031 A | 7/1992 | Wieners et al. |
| 5,283,303 A | 2/1994 | Groh et al. |
| 5,301,254 A | 4/1994 | Blickle et al. |
| 5,599,897 A | 2/1997 | Nishiguchi et al. |
| 5,760,139 A | 6/1998 | Koike et al. |
| 5,908,916 A | 6/1999 | Woudenberg et al. |

FOREIGN PATENT DOCUMENTS

| | | |
|---|---|---|
| EP | 0645413 A | 3/1995 |
| JP | 61-117501 | 6/1986 |
| JP | 63-172728 | 7/1988 |
| JP | 3045908 A | 2/1991 |
| JP | 4013720 | 1/1992 |
| JP | 05-112635 | 5/1993 |
| JP | 10-81738 | 3/1998 |
| WO | WO99/31533 | 6/1999 |

OTHER PUBLICATIONS

Diaz, Fernando R. et al, "Synthesis and Characterization of Polyesters Derived From Polychlorinated Aromatic Diacids," J. Polym. Sci., Polym. Chem. Ed. (1981), 19(3), 729–740. (Abstract only).

Sivasamy, P. et al., "Effect of $\beta$–hydrogens on the Flame Retardancy of Hexolic Anhydride–Based Polyesters", Proc. Beijing Int. Symp./Exhib. Flame Retard., $2^{nd}$ (1993), pp. 246–250. (Abstract only).

Moore, R. et al., "Preparation of Polyesters from Diels–Alder Adducts", Brit UK. Pat. Appl. (1981), 6 pp. (Abstract only).

Sun, G. et al., "Study of the Liquid Crystal Properties of Thermotropic Wholly Aromatic Copolyesters. II. Effect of Substituted Groups", Gaofenzi Cailiao Kexue Yu Gongliheng (1989), 5(1), 37–41. (Abstract only).

Ballester Boix, M. et al., "Chemically and Thermally Resistant Polymers", (Consejo Superior de Investigaciones Cientificals, Spain). Span. (1980), 9 pp. (Abstract only).

*Primary Examiner*—Samuel A. Acquah
(74) *Attorney, Agent, or Firm*—Price, Heneveld, Cooper & DeWitt & Litton

(57) ABSTRACT

A polyester having less than 50 hydrogen-carbon bonds per 1000 molecular weight units exhibits very low optical loss in the range of wavelengths commonly used for optical communication, and exhibits other physical properties suitable for use as a waveguide core material and/or a waveguide cladding material in optical fibers and/or planar optical devices.

10 Claims, 1 Drawing Sheet

HIGHLY-HALOGENATED LOW OPTICAL LOSS POLYMER

CROSS-REFERENCE TO RELATED APPLICATION

This application is a divisional of U.S. application Ser. No. 09/705,614 entitled HIGHLY-HALOGENATED LOW OPTICAL LOSS POLYMER, filed Nov. 3, 2000, and now U.S. Pat No. 6,470,131 the entire disclosure of which is incorporated herein by reference.

BACKGROUND OF THE INVENTION

1. Field of the Invention

This invention relates to the field of optical polymers, and more particularly to highly-halogenated polymers which are useful for fabricating optical waveguides, including optical fibers and integrated optical or "planar" optical devices.

2. Technical Background

Optical waveguides normally consist of a core surrounded by a cladding having a refractive index which is slightly lower than the refractive index of the waveguide core. Glass has been a preferred material for fabrication of optical waveguides, especially optical fibers used to transmit light signals over long distances, because of the excellent mechanical properties of glass and because of the low optical loss of glass materials. However, the use of polymeric materials in the fabrication of optical waveguides has been extensively studied because polymers are lighter in weight than glass, more resistant to impact than glass, do not require surface grinding, and can be more easily mass-produced than glass waveguides.

The polymers that have been frequently used for optical waveguide cores and claddings include homopolymers and copolymers of methylmethacrylate, styrene and esters of methacrylic acid with aliphatic alcohols sometimes containing fluorine, and copolymers of vinylidine fluoride with other monomers containing fluorine. Polymers which have been frequently used for waveguide cladding include homopolymers and copolymers of methacrylates of alcohols containing fluorine, and copolymers of vinylidene fluoride with other monomers containing fluorine.

A problem with most organic polymers is that higher harmonics of carbon-hydrogen bond stretching absorb light in a near-infrared region from about 1000 nm to about 1600 nm. This region encompasses the wavelengths of light signals which are commonly used in optical communication. Accordingly, an undesirable loss of optical signal is associated with the use of most polymer materials for optical waveguides. In order to lower absorption losses of organic polymers in this region, deuterium or fluorine have been used to replace hydrogen atoms bonded to carbon in polymers. However, the incorporation of deuterium is not cost effective and only serves to shift the wavelength at which light is absorbed, but does not totally eliminate absorption of light signals used in optical communication. The use of fluorine also has several disadvantages. High loading of fluorine can lower the refractive index to a level that renders the material incompatible with standard optical fibers, which have refractive indices of about 1.44 at 1550 nm. Another disadvantage is that highly fluorinated polymers do not adhere to other materials. This makes it difficult to join a waveguide cladding to a waveguide core or a substrate for a planar optical device, or to attach input and output fibers to the planar optical device. Also, substitution of fluorine for hydrogen in many polymers results in a polymer which is unacceptably soft, e.g., a polymer having an undesirably low glass transition temperature, melting point temperature, and/or modulus. A further disadvantage with many of the known fluorinated polymers is that they can have a tendency to become cloudy due to crystallization of fluorine-containing components, e.g., vinylidene fluoride and tetrafluoroethylene monomeric units.

Therefore, there is a need for optical polymers which exhibit very low optical loss in the range of wavelengths commonly used for optical communication (e.g., 1000 nm to 2000 nm) and which have a higher glass transition temperature, melting point temperature, and modulus than known highly-halogenated optical polymers.

SUMMARY OF THE INVENTION

The invention pertains to the provision of a highly-halogenated optical polymer which exhibits very low optical loss in the range of wavelength commonly used for optical communication (e.g., about 1000 nm to about 2000 nm), and which in accordance with certain preferred embodiments exhibits improved mechanical properties, such as a higher melting point temperature, and a higher modulus than known highly-halogenated polymers used in optical communications. The polymers of this invention are amorphous film forming polymers that have a relatively low variance of refractive index with temperature. This invention also pertains to the use of such polymers as waveguide core and/or waveguide cladding materials in optical fibers and/or planar optical devices.

The optical polymer of this invention are highly-halogenated polyesters, including highly-halogenated polycarbonates. Specific embodiments include polyesters of a highly-halogenated dicarboxylic acid or a derivative of a highly-halogenated dicarboxylic acid and a polyol, and polycarbonates derived from a carbonic acid derivative and a highly-halogenated polyol.

DETAILED DESCRIPTION OF THE PREFERRED EMBODIMENT

Figure 1:
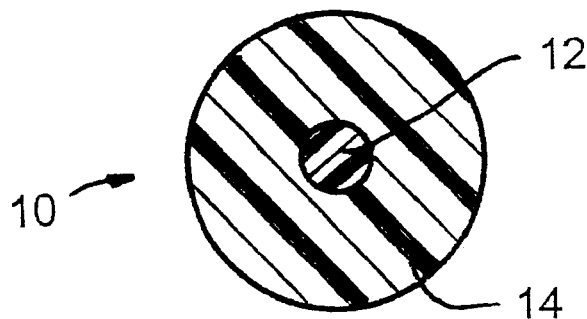
FIG. 1 is a cross-sectional view of an optical fiber comprising a highly-halogenated polyester in accordance with this invention.

The highly-halogenated optical polymers of this invention are condensation polyesters, including polycarbonates with less than 90% of the halogens being fluorine, having less than 50 carbon-hydrogen bonds per 1000 molecular weight units, more preferably less than 20 carbon-hydrogen bonds per 1000 molecular weight units, and even more preferably less than 10 carbon-hydrogen bonds per 1000 molecular weight units. The optical polymers of this invention are characterized by their low C—H bond content and by their low optical losses. More specifically, the optical polymers of this invention exhibit an optical loss of less than 0.5 dB/cm at 1550 nm.

In accordance with one aspect of the invention, the highly-halogenated polyesters are polymers having repeating units of the formula [—O—R—CO—] in which R is the residue of a hydroxy carboxylic acid or a lactone, or of the formula [—O—CO—$R^1$CO—O—$R^2$—] in which $R^1$ is the residue of a highly-halogenated dicarboxylic acid or the derivative of a highly-halogenated dicarboxylic acid, and $R^2$ is the residue of a polyol (i.e., a species having two or more hydroxyl groups that can react with a carboxylic acid group to form an ester). A residue, as used herein, refers to the polyvalent moieties $R^1$, and $R^2$ in the polymer which, result when a polycarboxylic acid such as a dicarboxylic acid having the formula $R^1(COOH)_2$ is reacted with a polyol such as a diol having the formula $R^2(OH)_2$, regardless of whether the polyester is actually the polycondensation product of the polycarboxylic acid and polyol.

Polyesters can be produced by direct esterification of a polyacid such as a diacid with a polyol such as a diol or self-condensation of a hydroxy carboxylic acid (e.g., HO—R—COOH or lactone). Direct esterification of a polyacid with a polyol requires continuous removal of water to achieve high conversions and high molecular weights. In practice, relatively few linear polyesters are synthesized by direct reaction of polyacids and polyols because of the high temperatures required to completely eliminate water. The reaction of acid anhydrides and polyols suffers from the same problem. However, these reactions are frequently used to synthesize low molecular weight polyesters. As an alternative, the polyesters may be synthesized by reaction of the corresponding polyacid chlorides with polyols. As another alternative, an ester interchange reaction, typically using a polymethyl ester or polyphenyl ester corresponding to the polyacid, may usually be used to achieve a faster reaction than direct esterification of the polyacid.

Suitable catalysts are well known, and may be employed. When the polyesters are prepared by direct polyesterification of polycarboxylic acids or the anhydrides thereof, p-toluenesulfonic acid is an example of a suitable catalyst. When dialkyl dicarboxylates or poly carboxylic esters are used, customary transesterification catalyst, may be used, such as zinc acetate, mixtures of calcium acetate and antimony oxide or tetraalkoxytitanates, such as titanium tetraisobutoxide or titanium tetraisopropoxide. Examples of other catalysts include carbonates, acetates and/or alkoxylates of lithium, sodium, magnesium, cobalt, manganese, vanadium, titanium and tin or tinoxides. Such catalysts may be employed in conventional amounts, such as from about 20 ppm to about 5000 ppm based on the components used in the condensation.

The condensation can be carried out in the presence of anti-oxidants, for example substituted phenols, such as 2,5-di-tert-butylphenol, 2-methylcyclohexyl-4,6-dimethylphenol, 2,6-di-tert-butyl-4-methylphenol, pyrogallol, phosphoric acid or other antioxidants customary for this purpose.

Examples of dicarboxylic acids and dicarboxylic acid derivatives which may be used for preparing the highly-halogenated optical polymers of this invention include chlorendic acid, chlorendic anhydride, the diacylhalide of chlorendic acid, such as the diacylchloride of chlorendic acid, diesters of chlorendic acid, such as the dimethylester of chlorendic acid, the diacid salts of chlorendic acid, and the like. Chlorendic anhydride is 1,4,5,6,7,7-hexachlorobicyclo[2.2.1]hept-5-ene 2,3-dicarboxylic anhydride. Chlorendoyl chloride is 1,4,5,6,7,7-hexachlorobicyclo[2.2.1]hept-5-ene 2,3-dicarbonyl chloride. Chlorendate is 1,4,5,6,7,7-hexachlorobicyclo[2.2.1]hept-5-ene 2,3-dicarboxylate. Suitable derivatives of chlorendic acid also include addition products to the carbon-carbon double bond of chlorendic acid, chlorendic anhydride, the diacylhalides of chlorendic acid, the diesters of chlorendic acid, and the diacid salts of chlorendic acid. Examples of other dicarboxylic acids and derivatives of dicarboxylic acids which may be used in preparing the highly-halogenated optical polymers of this invention include tetrachlorophthalic acid, tetrachloroisophthalic acid, tetrachloroterephthalic acid, tetrafluorophthalic acid, tetrafluoroisophthalic acid, tetrafluoroterephthalic acid, tetrabromophthalic acid, tetrabromoisophthalic acid, tetrabromoterephthalic acid, and the derivatives thereof. Examples of derivatives include the anhydrides, diacylhalides, diesters, diacid salts, and the like of any of the above listed dicarboxylic acids.

Suitable polyols include tetrachloro-1,4-hydroquinone, tetrachloro-1,2-hydroquinone, 2,3,5,6-tetrachloro-α,α'-xylene diol, 2,3,4,6-tetrachloro-α, α'-xylene diol, ethylene glycol terminated poly(tetrafluoroethylene glycol) (e.g. "FLUOROLINK® E") or ("FLUOROLINK® T"), 2,2,3,3,4,4,5,5-octafluoro-1,6-hexane diol, ethylene glycol, 1,6-hexane diol, and the like. The corresponding dialkoxide salts or dialkylhalides of the above listed diols may also be used for preparing the highly-halogenated optical polymers of this invention.

Polyesters prepared from the above dicarboxylic acids or derivatives of dicarboxylic acids and the above listed diols or derivatives of diols exhibit low optical loss in the range of wavelengths commonly used for optical communication (e.g., about 1000 nm to about 2000 nm), and generally exhibit a higher glass transition temperature, melting point temperature, and modulus than known highly-halogenated optical polymers. Such polymers typically exhibit an optical loss of less than 0.5 dB per centimeter, less than 0.2 dB per centimeter, or even less than 0.1 dB per centimeter at infrared wavelengths. Optical and other physical properties can be adjusted as desired by selecting appropriate reactants. For example, the refractive index can be adjusted by appropriate selection of the diol or diols used for preparing the polyesters of this invention. As a specific example, a polyester prepared from chlorendic acid or a derivative thereof and a highly-chlorinated diol or diol derivative, such as tetrachloro-1,4-hydroquinone, would be expected to have a higher refractive index than a similar polyester prepared with ethylene glycol instead of tetrachloro-1,4-hydroquinone. On the other hand, use of fluorinated polyol would be expected to lower the refractive index even further than the non-halogenated polyol. Deuterated monomers may also be used to lower the refractive index of the polymer. A blend of a highly-chlorinated diol or diol derivative and a fluorinated diol or diol derivative may be used to achieve generally any desired refractive index between the extremes when either all of the diol or diol derivative is highly-halogenated, and when all of the diol or diol derivatives are non-halogenated. As another example, physical properties relating to the hardness or softness of the polymer (e.g., melting point temperature, glass transition temperature ($T_g$), and modulus) can be adjusted by appropriate selection of the dicarboxylic acid or derivative thereof, and/or appropriate selection of the diols or derivatives thereof. In general, chlorinated dicarboxylic acids and chlorinated derivatives of dicarboxylic acids will provide a harder polymer (e.g., a polymer having higher glass transition temperature, melting point temperature and modulus) than the fluorinated analogs of the dicarboxylic acids or dicarboxylic acid derivatives. Likewise, the chlorinated diols and chlorinated diol derivatives would provide a harder polymer than the fluorinated analogs thereof. Accordingly, $T_g$ and other properties can generally be adjusted as desired for processing reasons or for particular applications (e.g., use temperatures).

In accordance with another embodiment of the invention, the highly-halogenated polyesters are polycarbonates having repeating units represented by the formula [—O—CO—

R³—] in which R³ is the residue of a halogenated diol or derivative thereof. Examples of suitable halogenated diols include those listed above, and the like, including fluoro-, chloro- and bromo-analogs of the diols listed above. The polycarbonates of this invention can be prepared from generally any highly-halogenated polyol and a carbonate diester. Examples of suitable carbonate diesters include carbonic acid derivatives such as phosgene, triphosgene (hexachloromethylcarbonate), diphenyl carbonate, and the like. As another alternative, the polycarbonates of this invention may be prepared by a melt transesterification reaction between a diol and a carbonate ester.

As with the more conventional polyesters prepared from dicarboxylic acids or derivatives of dicarboxylic acids, the optical and other physical properties of the polycarbonates can be adjusted by appropriate selection of the polyol. For example, a polycarbonate prepared from chlorinated polyols would be expected to exhibit a higher melting point temperature, glass transition temperature, and modulus than a polycarbonate prepared with a fluorinated analog. As with the more conventional polyesters prepared from carboxylic acids or carboxylic acid derivatives, the polycarbonates of this invention have very few, if any, carbon-hydrogen bonds, and therefore, exhibit an optical loss in the range of wavelengths commonly used for optical communication (e.g., about 1000 nm to about 2000 nm) which is less than 0.5 dB per centimeter, preferably less than 0.2 dB per centimeter, and even more preferably less than 0.1 dB per centimeter.

Mixtures of fluorinated and chlorinated polyacids and polyols may be used, and are often preferred, to achieve a desirable balance of adhesion, solubility, and refractive index.

In many optical applications, it is desirable to have control of the waveguide refractive index. In the general case, one wants the waveguide to be index matched to the input fiber in order to reduce coupling losses. This calls for a refractive index of about 1.44 in the infrared. However, more specialized applications may require guide indices significantly greater than this, possibly up to 1.60 and beyond.

It is possible to use halogenation to control refractive index. Traditional fully hydrogenated engineering polymers tend to have refractive indices from 1.48 (PMMA) to 1.59 (polystyrene). Polymers constructed from highly fluorinated monomers, while low in absorption loss, tend to have much lower refractive indices than their hydrogenated analogs, reflecting the low polarizability of the C—F bond. Use of chlorinated monomers raises the polymer refractive index, due to the relatively high polarizability of the C—Cl bond, while maintaining a low concentration of carbon-hydrogen bonds and therefore a low absorption loss. Brominated polymers are even higher in index.

There are some examples in the literature of very highly chlorinated polyesters for use as flame retardants. Generally, these materials are isolated as brown, insoluble powders. Less chlorinated polymers have also been made, again for flame retardancy. These polymers, while more soluble and processable, have a much higher concentration of C—H bonds, and are expected to have a correspondingly larger optical loss in the infrared, making them less suitable for waveguide applications. When designing these polymer systems, it is sometimes necessary to compromise between C—H bond concentration and the physical characteristics necessary for the particular processing method being employed. For example, for a hot embossing process, a fairly high $T_g$ may be desired, while for a solution spin-coating onto glass, a somewhat lower $T_g$ may be necessary.

We have found that using a completely rigid diol (e.g. tetrachlorohydroquinone) affords a polymer with an extremely high $T_g$, while using a very flexible diol (e.g octafluorohexanediol) gives material with a much lower $T_g$. A highly desirable combination of properties has been achieved with the chlorinated diol tetrachloroxylene-α,α'-diol, which is a rigid aryl core with a flexible methylene spacer on each side.

Choice of reaction conditions turns out to be fairly important as well. As the chlorendate ring system is fairly base-sensitive, only acidic esterification conditions can be used. We have found that the best way to make highly-halogenated polyesters is to heat the corresponding diols and diacid chlorides together in refluxing chlorobenzene, with a constant argon stream sweeping out the by-product of the reaction, HCl gas. To force the reaction to completion, the bulk of the chlorobenzene is distilled off, leaving only enough to plasticize the polymer during the subsequent heating.

Figure 2:
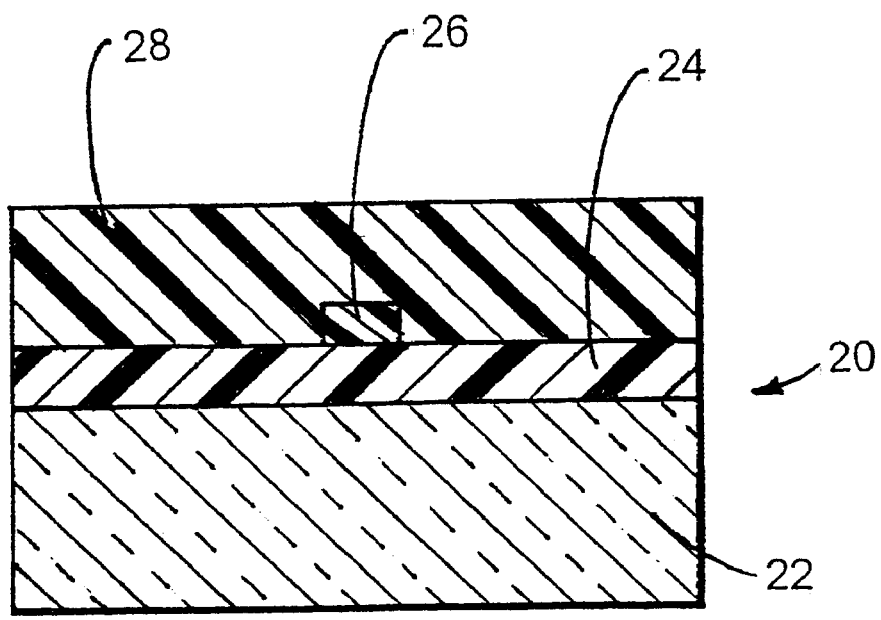
FIG. 2 is a cross-sectional view of a planar optical device including a highly-halogenated polyester in accordance with this invention.

Because the optical properties, including refractive index, of the polyesters (including polycarbonates) of this invention can be adjusted as desired by appropriate selection of reactants, it is possible to prepare optical communication devices having a polymer waveguide in which the waveguide core, the waveguide cladding, or both the waveguide core and waveguide cladding are comprised of a highly-halogenated polyester in accordance with this invention. For example, an optical fiber 10 (FIG. 1) may include a waveguide core 12 comprised of a polyester according to the invention, and a waveguide cladding 14 comprised of a polyester in accordance with the invention. An optical fiber having a polymer core and a polymer cladding can be prepared by first extruding the core and subsequently extrusion coating the cladding onto the core, or by coextruding the core and cladding by using an extruder and a bi-component spinneret. As another alternative, the core may be extruded and the cladding subsequently applied in the form of a dispersion coating which is subsequently dried. Similarly, a planar optical device 20 (FIG. 2) comprising a substrate 22, an undercladding layer 24, a waveguide core 26, and an overcladding layer 28 may incorporate highly-halogenated polyesters in accordance with this invention in any of the undercladding layer 24, overcladding layer 28 or waveguide core 26.

The planar optical device 20 may be fabricated using conventional techniques for depositing optical polymer layers, e.g., spin coating. Undercladding layer 24 is first deposited on substrate 22. Then the core layer 26 is deposited on layer 22 and subsequently patterned such as by using conventional etching techniques. Overcladding layer 24 is then deposited over patterned core 26 and undercladding layer 24.

The polymers of this invention may also be used to make bulk optical elements such as simple lenses, Fresnel lenses, diffraction elements, complex lenses, prisms and the like. The polymers of this invention are also useful for fabricating passive athermalized devices such as wavelength division multiplexers/demultiplexers, wherein the positive variance of the refractive index with temperature (dn/dT) of a glass, sol-gel or sol-gel hybrid waveguide is compensated for by providing a polymer waveguide segment having a negative dn/dT.

The following examples illustrate how properties such as refractive index, glass transition temperature, and adhesion can be selectively achieved by appropriate selection of monomers.

EXAMPLES

Example I

In practice, the refractive index of highly-halogenated polyesters can be tuned by using an appropriate mixture of chlorinated, brominated and fluorinated monomers, as demonstrated in the table below.

| Polymer | Refractive index |
| --- | --- |
| Poly(2,3,5,6-tetrachloroxylylene chlorendate) | $n_{1541} = 1.559$ |
| Poly(2,3,5,6-tetrachloroxylylene(50%)-co-2,2,3,3,4,4,5,5-octafluorohexamethylene(50%) chlorendate) | $n_{1541} = 1.5284$ |
| Poly(2,2,3,3,4,4,5,5-octafluorohexamethylene chlorendate) | $n_{1541} = 1.4744$ |

Example II

Tailoring of Glass Transition Temperature

The glass transition temperature ($T_g$) is an important processing parameter for polymeric materials. The desired glass transition temperature for a material depends on the requirements for device stability and the fabrication process used. In any case, it is advantageous to be able to tune the $T_g$ of the material. Using more flexible monomer units, such as octafluorohexanediol, will lower the $T_g$, while use of less flexible monomer units, such as tetrachloro-p-phenylene, will increase the $T_g$. Examples are shown in the table below.

| Polymer | Glass transition temperature |
| --- | --- |
| Poly(2,3,5,6-tetrachlorophenylene chlorendate) | No $T_g$ observed below 300° C., |
| Poly(2,3,4,6-tetrachloroxylylene chlorendate) | $T_g = 172°$ C. |
| Poly(2,3,5,6-tetrachloroxylylene chlorendate) | $T_g = 183°$ C. |
| Poly(2,3,5,6-tetrachloroxylylene(75%)-co-2,2,3,3,4,4,5,5-octafluorohexamethylene(25%) chlorendate) | $T_g = 160°$ C. |
| Poly(2,3,5,6-tetrachloroxylylene(50%)-co-2,2,3,3,4,4,5,5-octafluorohexamethylene(50%) chlorendate) | $T_g = 141°$ C., |
| Poly(2,2,3,3,4,4,5,5-octafluorohexamethylene chlorendate) | $T_g = 67°$ C. |

Example III

Adhesion

One general problem with highly fluorinated materials is adhesion; their low surface energy, while prized in other applications, makes it difficult to get them to adhere well to common substrates and adhesives. Surface treatments and adhesion layers can lessen the problem, but add additional processing steps. Highly chlorinated polymers, on the other hand, tend to be fairly adhesive. As an extremely qualititative example, the solid polymers stick very well to the flask they are made in; generally, pieces cannot be pried out and must be dissolved out.

A somewhat less qualitative test for adhesion is the tape test. In this, a polymer film on a substrate is cut into a grid, standard office adhesive tape is applied and ripped off several times. One looks for delamination of material from the grid. Films of poly(2,3,5,6-tetrachloro-p-phenylene chlorendate) and poly(2,3,5,6-tetrachloro-p-xylylene(99%)-co-trimethylolpropane(1%) chlorendate) spin coated onto poly(methyl methacrylate) survived the tape test with absolutely no delamination. A film of poly(2,3,5,6-tetrachloro-p-xylylene(51%)-co-2,2,3,3,4,4,5,5-octafluorohexamethylene(49%) chlorendate(75%)-co-tetrachlorophthalate(25%)) on glass also survived the tape test with no sign of delamination.

Masterbond UV-15 adhesive was applied to the surface of each of these samples, and cured with ultraviolet light until hard. These adhesive-on-polymer samples also survived the tape test.

Example IV 8.318 g (30.1 mmol) tetrachloroxylene-α,α'-diol and 12.824 g (30.1 mmol) chlorendoyl chloride were ground to a powder in a 100 mL 3-neck flask. 20 mL chlorobenzene was added, and the necks fitted with a reflux condenser, a mechanical stirrer with a Teflon blade, and an argon purge inlet. The top of the reflux condenser was fitted with an output bubbler. The reaction mixture was brought to reflux, and the argon stream was started. After 3 hours at reflux, the tetrachloroxylenediol had completely dissolved. The reflux condenser was replaced with a distillation head, and the mixture was concentrated by distillation until a viscous liquid remained. This viscous liquid was heated at 160° C. for 10 hours, with addition of a couple of mL of chlorobenzene every few hours to keep the mixture from solidifying. The polymer was allowed to cool overnight, and the resultant glassy mass was dissolved in tetrahydrofuran and precipitated from methanol. The polymer was filtered and dried for two days in a 100° C. vacuum oven to give 17.992 g poly(2,3,5,6-tetrachloroxylylene chlorendate) in 95% yield.

It will become apparent to those skilled in the art that various modifications to the preferred embodiment of the invention as described herein can be made without departing from the spirit or scope of the invention as defined by the appended claims.

What is claimed is:

1. A polyester having less than 50 hydrogen-carbon bonds per 1000 molecular weight units, and an optical loss of less than 0.5 dB/cm at 1550 nm, the polyester containing halogen atoms, wherein less than 90% of the halogen atoms are fluorine atoms.

2. The polyester of claim 1, comprising repeating units represented by the formula [—O—R—CO—] in which each R is the residue of a hydroxy carboxylic acid or a lactone.

3. The polyester of claim 1, comprising repeating units represented by the formula [—O—CO—$R^1$—CO—O—$R^2$—] in which each $R^1$ is the residue of a highly-halogenated dicarboxylic acid or a residue of a derivative of a highly-halogenated dicarboxylic acid and each $R^2$ is the residue of a polyol.

4. The polyester of claim 3, wherein each $R^1$ is the residue of chlorendic acid or a derivative of chlorendic acid.

5. The polyester of claim 3, wherein each $R^1$ is the residue of a compound selected from the group consisting of tetrachlorophthalic acid, a derivative of tetrachlorophthalic acid, tetrachloroisophthalic acid, a derivative of tetrachloroisophthalic acid, tetrachloroterephthalic acid, a derivative of tetrachloroterephthalic acid, tetrafluorophthalic acid, a derivative of tetrafluorophthalic acid, tetrafluoroisophthalic acid, a derivative of tetrafluoroisophthalic acid, tetrafluoroterephthalic acid, a derivative of tetrafluoroterephthalic acid, tetrabromophthalic acid, a derivative of tetrabromophthalic acid, tetrabromoisophthalic acid, a derivative of tetrabromoisophthalic acid, tetrabromoterephthalic acid, and a derivative of tetrabromoterephthalic acid.

6. The polyester of claim 3, wherein each $R^2$ is the residue of a halogenated polyol.

7. The polyester of claim 5, wherein each $R^2$ is selected from the group consisting of tetrachloro-1,4-hydroquinone, tetrachloro-1,2-hydroquinone, 2,3,5,6-tetrachloro-α, α'-xylene diol, 2,3,4,6-tetrachloro-α, α'-xylene diol, ethylene glycol terminated poly(tetrafluoroethylene glycol), 2,2,3,3,4,4,5,5-octafluoro-1,6-hexane diol, a dialkoxide salt of any of these, and a dialkylhalide of any of these.

8. The polyester of claim 1, wherein the polyester is a polycarbonate having repeating units represented by the formula [—O—CO—$R^3$—] wherein $R^3$ is a halogenated polyol.

9. The polyester of claim 8, wherein each $R^3$ is a residue of a compound selected from the group consisting of tetrachloro-1,4-hydroquinone, tetrachloro-1,2-hydroquinone, 2,3,5,6-tetrachloro-α, α'-xylene diol, 2,3,4,6-tetrachloro-α, α'-xylene diol, ethylene glycol terminated poly(tetrafluoroethylene glycol), 2,2,3,3,4,4,5,5-octafluoro-1,6-hexane diol, a dialkoxide salt of any of these, and a dialkylhalide of any of these.

10. The polyester of claim 3, in which $R^2$ is a mixture of the residue of a chlorinated polyol and a fluorinated polyol.

* * * * *